Dec. 13, 1966   P. S. TRAYCOFF   3,291,546
APPARATUS FOR STORING AND DELIVERING HOT AND COLD FOOD
Filed Jan. 28, 1960   3 Sheets-Sheet 1
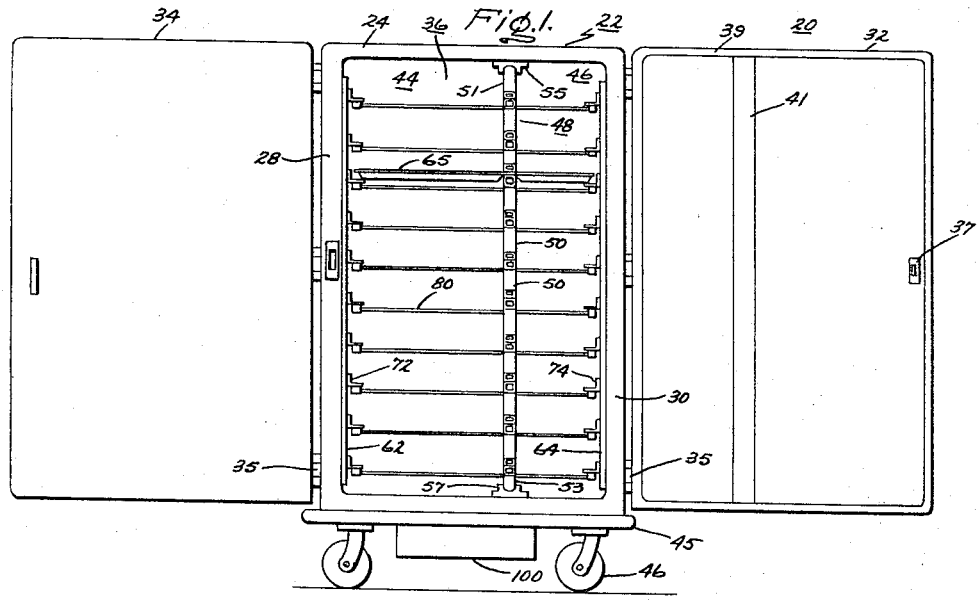
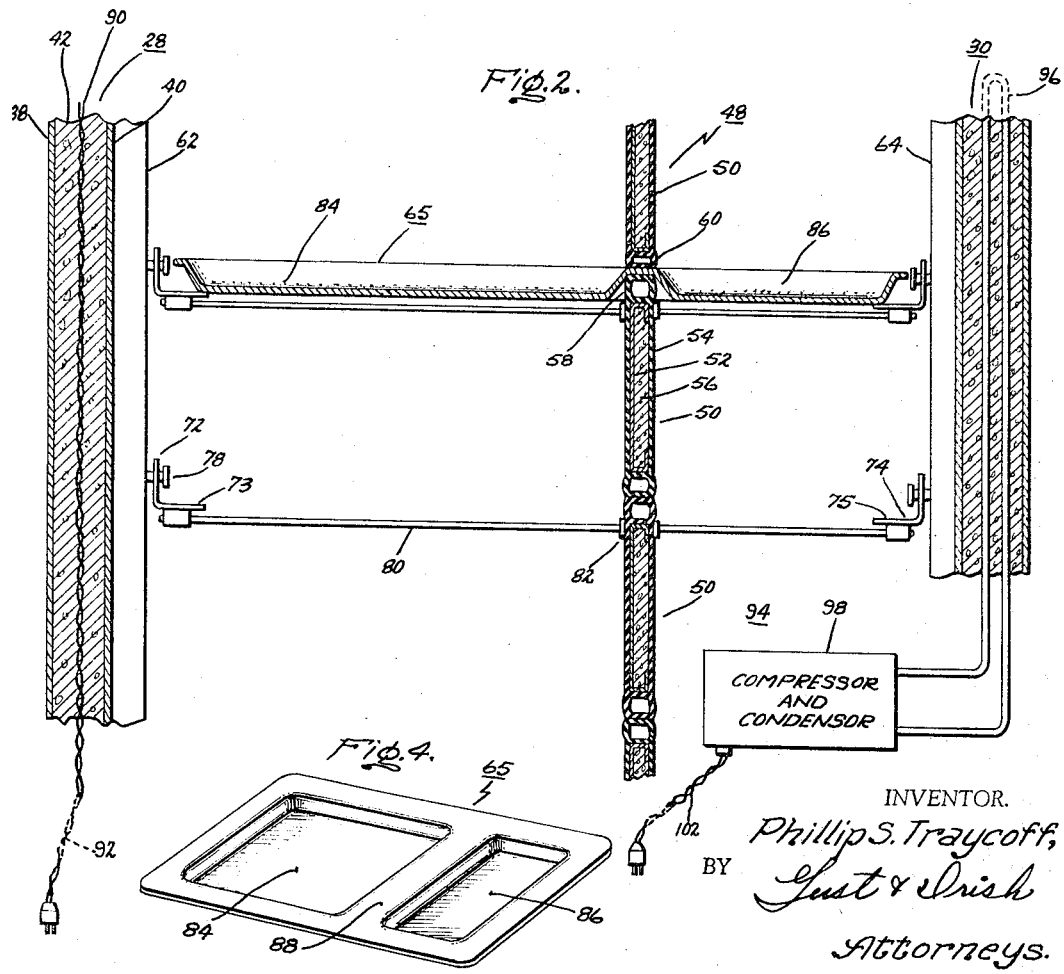
INVENTOR.
Phillip S. Traycoff,
BY
Just & Irish
Attorneys.

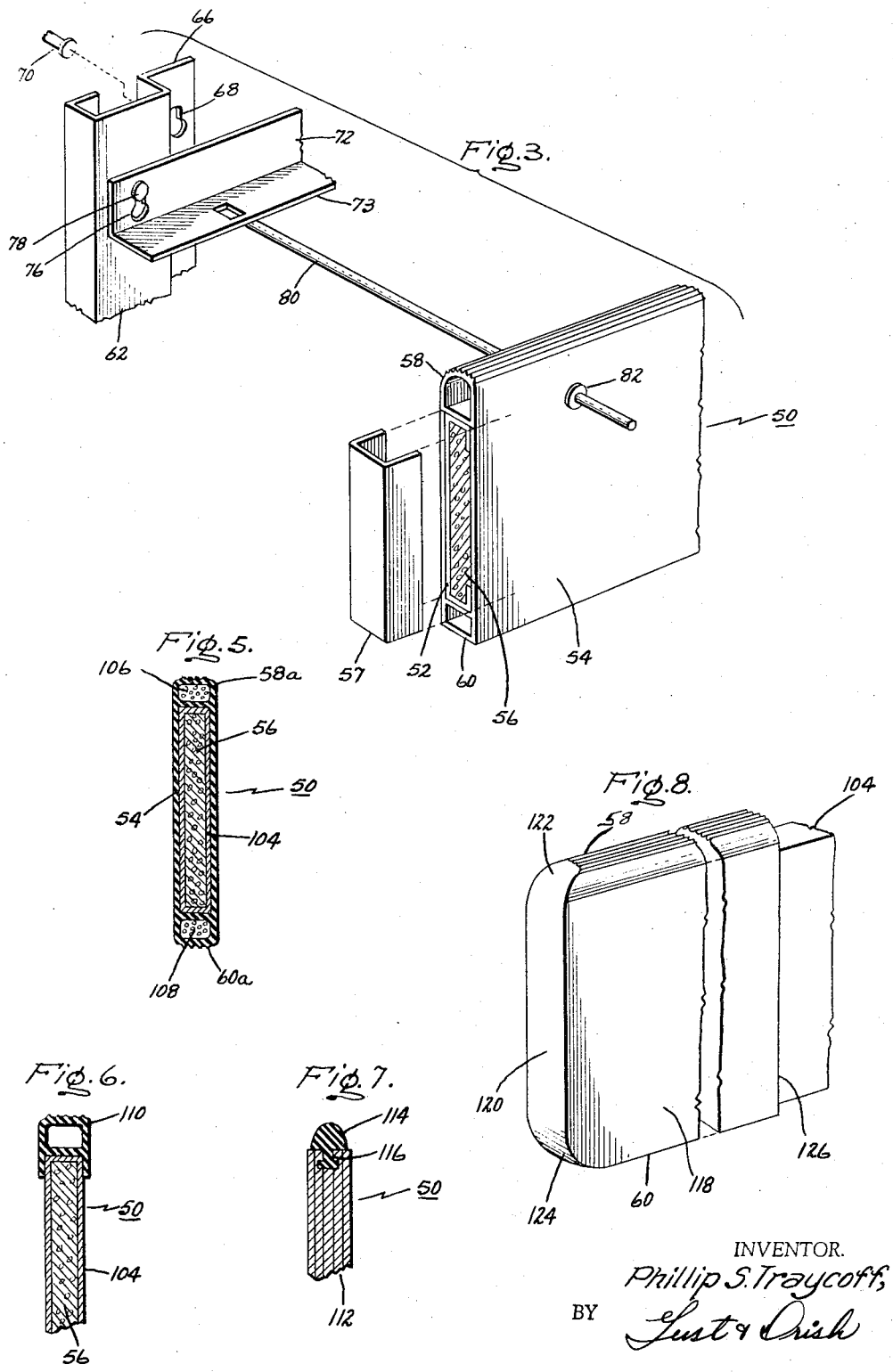

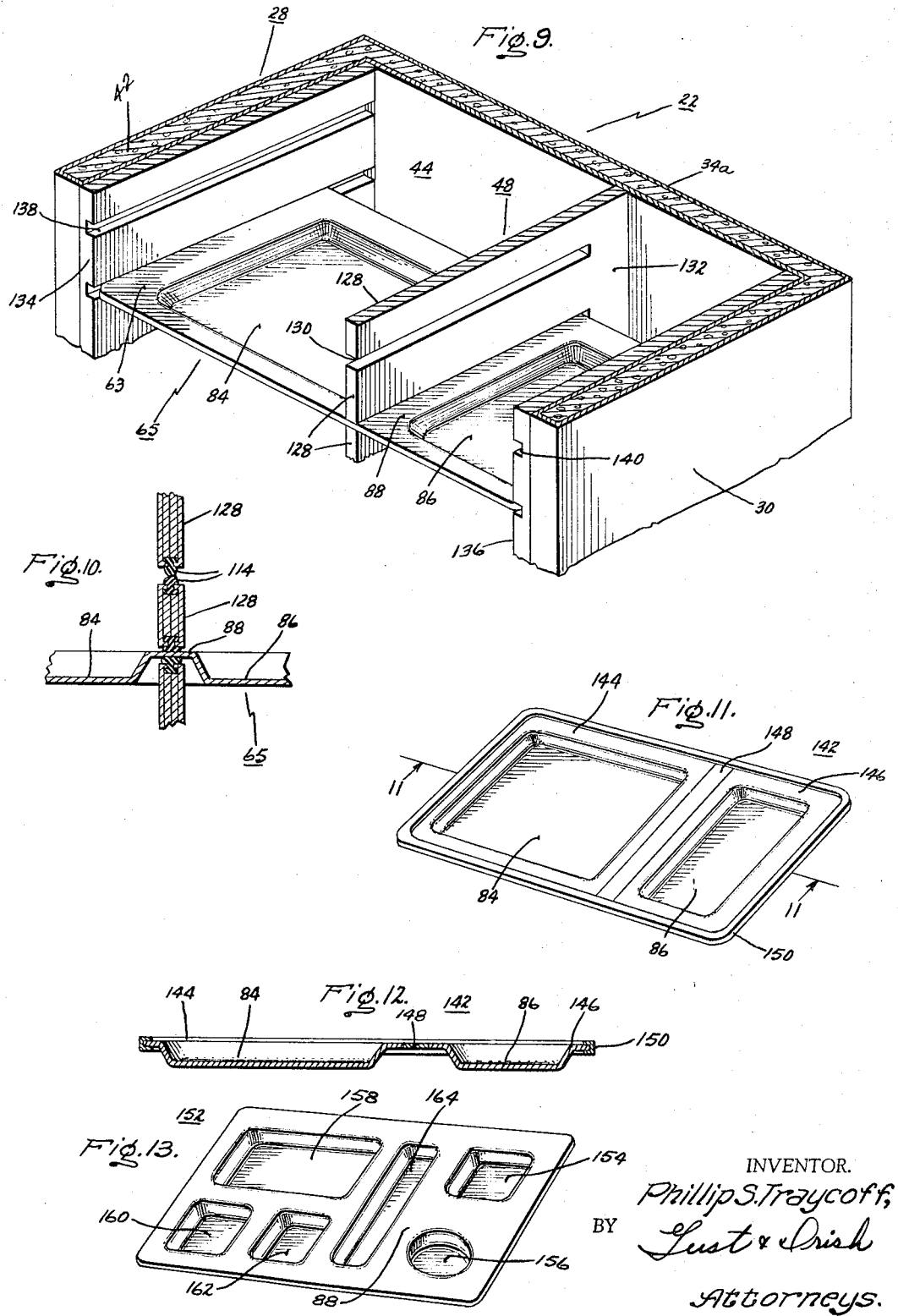

United States Patent Office 3,291,546
Patented Dec. 13, 1966

3,291,546
APPARATUS FOR STORING AND DELIVERING HOT AND COLD FOOD
Phillip S. Traycoff, 231 E. Woodland Ave., Fort Wayne, Ind.
Filed Jan. 28, 1960, Ser. No. 5,272
14 Claims. (Cl. 312—214)

This invention relates generally to appartus for storing and delivering hot and cold food, and more particularly to appartus for storing and delivering compartmented trays of preportioned hot and cold food directly from the food preparation point to the consumer.

In many institutional and commercial establishments, such as hospitals, churches, factories, airlines, prisons, railroads, etc. it is desirable to deliver food to consumers on food-serving trays; it is quite commonly desirable to serve both hot and cold food on the same tray, e.g., meat and vegetables on the one hand, and salads and desserts on the other hand. While many devices, such as wheeled carts, rtansportable chests and conveyors are commercially available for transporting food on trays from its preparation point to a remote destination, to the best of the present applicant's knowledge, when the trays are to include cold items in addition to hot items, it has been common practice separately to store and transport such cold items in a separate conveying device, or in a separate compartment of the device for transporting the hot food. Prior devices of this type thus require transportation of the hot and cold components of the meal either in separate devices, or in separate compartments of the same device to a central distribution point where the trays are made up from the separate hot and cold items, and then distributed by hand. Some use has been made of trays preportioned at the preparation point, however, in instances when hot and cold food has been served on the same tray, it has been necessary to employ separate heating and chilling devices on the tray. Thus the hot food has been served in Pyrex dishes with covers, and with accompanying heating pellets or capsules, while the cold food has likewise been served in covered dishes with accompanying cooling pads or other artifical refrigerants such as dry ice. Therefore, it has still been necessary to remove the various covers and heating and cooling devices prior to serving the tray to the ultimate consumer. To the best of the present applicant's knowledge, no device or system is presently available, other than the above-described system employing covers, Pyrex dishes, and heating and cooling devices for each tray, which can be employed to transport a completely preportioned tray of both hot and cold food from the food preparation point directly to the ultimate consumer while maintaining the hot and cold food respectively at the desired serving temperatures.

It is therefore an object of my invention to provide apparatus for storing and delivering compartmented trays of preportioned hot and cold food from the point of food preparation directly to the consumer.

In accordance with the broader aspects of my invention, I provide a transportable chest with partition means therein vertically dividing the same into two sections. The partition means has at least two vertically spaced-apart sections defining a horizontally extending slot therebetween. At least one food tray is provided having at least two longitudinally spaced-apart compartments formed therein for respectively receiving hot and cold food and defining therebetween a portion extending transversely across the tray. Means are provided for removably supporting the tray in the chest with the transverse portion thereof extending through the partition slot, thereby respectively locating the two compartments in the two chest sections. In this manner, transfer of heat from the chest section in which the hot food is located to the other section in which the cold food located is substantially reduced by the partition which separates and insulates the two chest sections from each other.

Further objects and advantages of my invention will become apparent by reference to the following description and the accompanying drawing, and the features of novelty which characterize my invention will be pointed out with particularity in the claims annexed to and forming a part of this specification.

In the drawings, FIG. 1 is a side-elevational view of a typical hot and cold food storage and delivery cart incorporating my invention;

FIG. 2 is a fragmentary cross-sectional view further illustrating the construction of the cart of FIG. 1;

FIG. 3 is a fragmentary view in perspective further illustrating the construction of FIGS. 1 and 2;

FIG. 4 is a view in perspective showing a compartmented tray for use in the embodiments of FIGS. 1 through 3;

FIG. 5 is a cross-sectional view showing a modified form of a partition section;

FIG. 6 is a fragmentary cross-sectional view showing another modified form of a partition section;

FIG. 7 is another fragmentary cross-sectional view showing still another modified form of partition sections;

FIG. 8 is a fragmentary view in perspective, partly broken away, showing yet another modified form of partition section;

FIG. 9 is a fragmentary view in perspective, partly broken away, showing a modified form of my invention;

FIG. 10 is a fragmentary cross-sectional view showing a modification of the embodiment of FIG. 9;

FIG. 11 is a view in perspective showing a modified form of compartmented tray useful in any embodiment of my invention;

FIG. 12 is a cross-sectional view of the tray of FIG. 11 taken along the line 11—11; and FIG. 13 is a view in perspective showing another form of compartmented tray, useful with any embodiment of my invention.

Referring now to FIGS. 1, 2 and 3, there is shown in FIG. 1 a cart, generally identified as 20, which incorporates my invention and which is suitable for use in storing and delivering preportioned trays of hot and cold food directly from the point of preparation to the ultimate consumers; cart 20 is thus suitable for use in such institutions as hospitals, churches, factories, prisons, and by catering establishments.

Cart 20 comprises a chest 22 having top and bottom walls 24 and 26 and side walls 28 and 30. In the illustrated embodiment, chest 22 is provided with two doors 32 and 34 which, when closed, respectively form the front and back walls of chest 22, thereby defining cavity 36. Doors 32 and 34 are respectively mounted on side walls 28 and 30 by suitable hinges 35 and are provided with conventional latch mechanisms 37. Doors 32 and 34 are also provided with conventional peripheral gaskets 39 which sealingly engage the front and back surfaces of walls 24, 26, 28 and 30 when the doors are closed. Doors 32 and 34 also have a vertically extending gasket 41 attached to their inner surfaces for a purpose to be hereinafter described. All of the walls of chest 22 are preferably formed of inner and outer walls 38 and 40 formed of any suitable material possessing the requisite structural strength, such as stainless steel, with the space therebetween being filled with suitable insulation material 42, such as fiberglass. A buffer 45 formed of suitable resilient material, such as rubber or neoprene surrounds the bottom of chest 22, and chest 22 is supported by casters 46 which provide the requisite transportability.

Cavity 36 defined by the walls of chest 22 is vertically divided into two compartments 44 and 46 by partition 48 which extends vertically between top and bottom walls 24 and 26 and transversely between doors 32 and 34. Partition 48 is formed of a plurality of vertically spaced sections 50, as shown. In the embodiment illustrated in FIGS. 1 through 3, inclusive, each of the partition sections 50 is formed of an elongated channel member 52 formed of suitable material such as stainless steel or a rigid plastic. Channel 52 is in turn embraced by a sleeve member 54 formed of suitable resilient material, such as vinyl; in the illustrated embodiment, sleeve 54 is preferably extruded. The interior space thus defined by channel 52 and sleeve 54 is filled with suitable insulating material, 56, such as expanded polyurethane.

Hollow gasket portions 58 and 60 are formed at the top and bottom respectively of sleeve 54 and, as will best be seen in FIG. 2, when the partition sections 50 are assembled in vertical alignment to form partition 48, and when trays 65 are not positioned in cavity 36 within chest 22, the gasket portions 58 and 60 of adjacent partition sections 50 respectively sealingly engage, as shown.

In order to support partition sections 50 within chest 22, I provide, in the embodiment illustrated in FIGS. 1 through 3, vertically extending channel members 62 and 64 respectively removably attached to the inner surfaces of side walls 28 and 30. More particularly, each of the channel members 62 and 64 is provided with a flange portion 66 having vertically spaced slotted openings 68 formed therein which cooperatively engage studs 70 attached to the respective side walls 28 and 30. A pair of horizontally disposed transversely extending angle members 72 and 74 are respectively removably attached to the vertically extending channels 62 and 64 by means of slotted openings 76 which cooperate with studs 78 secured to channel members 62 and 64 at the desired vertically spaced intervals. Rod elements 80 are respectively secured to angle members 72 and 74, and extend therebetween, as shown. Rod elements 80 respectively extend through partition sections 50 and are secured thereto in any suitable fashion, as by fastener means 82. It will be readily comprehended that at least two spaced-apart vertically extending channel members 62 and 64 will be required in order to support angle members 72 and 74, but that additionally extending vertically extending channel members may be provided if dictated by the depth of chest 22. Likewise, it will be readily comprehended that at least two rod elements 80 will be required for supporting each partition section 50, but that again additional rod elements may be provided if necessary for adequate support of the partition sections 50.

The uppermost and lowermost partition sections 51 and 53 are respectively slidingly seated in guides 55 and 57 secured to the inner surfaces of top and bottom walls 24 and 26, as shown.

It will be readily seen that by reason of the detachable mounting of channels 62 and 64 to side walls 28 and 30, and angle members 72 and 74 to channels 62 and 64, partition sections 50, 51 and 53, and channels 62 and 64 can be completely removed from the interior of chest 22 for individual cleaning and for cleaning of the interior of the chest.

In accordance with my invention and referring additionally to FIG. 4, I provide a compartmented tray 65 having at least two longitudinally spaced apart food receiving compartments 84 and 86 formed therein defining a portion 88 therebetween of generally uniform thickness which extends transversely across the tray, as best seen in FIG. 4. Trays 65 are positioned within chest 22, as best seen in FIGS. 1 and 2 with the bottom surfaces of compartments 84 and 86 respectively resting upon and being supported by horizontally disposed flanges 73 and 75 of angle members 72 and 74. It will be seen that the transverse portion 88 of tray 65 defined between compartments 84 and 86 extends through the slot defined between adjacent partition sections 50 and that its upper and lower surfaces are respectively sealingly engaged by the gasket portions 60 and 58. In the embodiment illustrated in FIGS. 1 through 3, trays 65 may be inserted or withdrawn from chest 22 through either door 32 or 34; to insert a tray 65, portion 88 is inserted between adjacent gasket portions 58 and 60 and the tray merely slid into position, as shown. It will now be seen that the two compartments 44 and 46 defined by partition 48 are effectively insulated from each other whether or not trays 65 are positioned in the chest 22. Trays 65 are preferably formed of suitable plastic material such as resin-reinforced fiberglass, or stainless steel.

Since the quantity of hot food served in a conventional meal is generally greater that the quantity of cold food served, in the preferred embodiment of my invention, as shown in FIGS. 1 through 4, the compartments 84 and 86 are made of unequal size, with the larger compartment 84 being intended for hot food. It will be observed that all of the hot food compartments 84 are positioned in the compartment 44 of chest 22 which thus may be designated as the hot food compartment, and likewise, cold food compartments 62 are positioned in the other compartment 46 which is therefore designated the cold food compartment. Unequal size of the compartments 84 and 86 is further desirable in order to prevent inadvertent positioning of a tray 65 with the cold food in the hot food compartment, and vice versa.

It will now be readily seen that by virtue of the provision of the insulated partition 48 formed of sections 50, transfer of heat from the hot food compartment 44 to the cold food compartment 46, thus respectively chilling the hot food and warming the cold food, is effectively reduced. It will at this time be seen that the vertically extending gaskets 41 on doors 32 and 34 sealingly engage the front and back ends of partition sections 50 thus completely sealing chest compartments 44 and 46 from each other. As shown in FIG. 3, it is sedirable to close the ends of channels 52 and resilient sleeves 54 of partition sections 50 in order to retain insulating material 56 therein and thus I provide end caps 57 respectively closing the ends, as shown; end caps 57 may be made of any suitable material, such as plastic or stainless steel.

In applications where the distance to be travelled between the point of food preparation and the ultimate destination are not long, and minimum storage time is involved, the insulating qualities of the walls of chest 22 and partition 48 may be adequate to maintain the hot and cold food in tray compartments 84 and 86 at the desired serving temperatures without supplemental heating and cooling of chest compartments 44 and 46. In other applications, however, where the distance to be travelled is greater or appreciable storage time is involved between food preparation and ultimate delivery, it may be desirable to provide supplemental heating for the hot food compartment 44 and cooling for the cold food compartment 46. Thus, as shown in FIG. 2, suitable electrical heating elements 90 may be provided in side wall 28 for heating food compartment 44; electrical heating elements 90 may be connected to any convenient outlet by means of cord and plug 92 while the cart is being loaded, and again connected when the cart reaches its final location. If, for example, chest 22 is employed in airline or railroad use, the electrical heating elements 90 may be connected when the chest is installed in the galley of the airplane or train for maintaining chest compartment 44 at the desired food serving temperature during the storage period prior to serving of the meals. Other means well known to those skilled in the art for warming the hot food compartment 44 may be provided, such as heat retaining pellets or capsules which can be positioned in the bottom of the compartment 44.

In order to maintain cold food compartment 46 at the desired serving temperature, a refrigeration system 94 may be provided with the usual evaporator coils 96 located in side wall 30 of chest 22 and with the compressor and condenser assembly 98 located in compartment 100 disposed underneath chest 22. Thus, in common with the heating elements 90, the refrigeration system 94 may be connected for energization by means of cord and plug 102 while the cart is being loaded, and again at the final destination, or, in the case of airplanes and railroads, the compressor may be energized during the storage period prior to serving of the food. It will also be readily apparent that compartment 46 may be chilled in other manners, well known in the art, such as positioning blocks of dry ice in storage compartment 46 at the bottom thereof, underneath the lowest tray.

It will now be readily apparent that with my invention, hot and cold food may be preportioned on tray 65 at the point of preparation, transported to the final destination, with an appreciable storage interval being tolerated, and finally served to the consumer on the same tray. My improved apparatus therefore completely eliminates the prior necessity of making up individual trays at local kitchen or galley areas.

Referring now to FIG. 5, each partition section 50 may be formed of an extruded tube 104 formed of suitable material, such as plastic or stainless steel, and having a rectangular cross-sectional configuration as shown. The interior of tube 104 is again filled with suitable insulation 56 and the tube is embraced by sleeve 54 of suitable resilient materials, such as vinyl. In the embodiment of FIG. 5, however, gasket portions 58a and 60a have the same cross-sectional configuration as opposed to the configuration of gaset portions 58 and 60 shown in FIGS. 1 through 3. In addition, it may also be desirable to fill the interiors of gasket portions 68a and 60a with suitable insulating material, such as flexible polyurethane, as at 106 and 108.

Referring now to FIG. 6, when tubular element 104 is employed in the partition sections 50, it may not be found necessary completely to embrace tubular element 104 with the sleeve 54 and thus, gasket elements 110 may be secured to the top and bottom ends in any suitable manner, as by an adhesive.

Referring now to FIG. 7, partition sections 50 may be formed of suitable laminated plastic material, as at 112, and gaskets 114 may be formed of suitable solid cross-sectional resilient material and secured to the top and bottom edges of laminated sections 112 by a dove-tail connection 116, as shown.

Referring now to FIG. 8, the partition construction shown in FIG. 5 may be modified further by providing molded vinyl sleeve members 118 in lieu of the extruded sleeve members 54. Molded sleeve members 118 thus may have a closed end 120 with tapered or curved top and bottom surfaces 122, 124, merging with gasket portions 58 and 60 in order to facilitate entry of transverse portion 88 of tray 65 between adjacent gasket portions 58 and 60. It will be readily apparent that sleeve portions 118 must be positioned on tubular member 104 from opposite ends and thus that two sleeve members 118 will be required for each partition section 50 with their ends 126 abutting.

Referring now to FIG. 9 in which like elements are indicated by like reference numerals, there is shown a modified form of my invention in which partition 48 is formed of vertically spaced-apart sections 128 respectively defining slots 130 therebetween, partition sections 128 being joined adjacent rear wall 34a of chest 22 by vertically extending section 132 secured to rear wall 34a, as shown. Trays 65 are supported within chest 22 by means of supporting members 134 and 136 respectively secured to the inner surfaces of side walls 28 and 30, and having horizontally disposed transversely extending and vertically spaced-apart slots 138 and 140 formed therein. Trays 65 thus have the longitudinal extremities of their flange portion 63 seated in and supported by slots 138 and 140 with transverse portion 88 between compartments 84 and 86 extending through and snugly accommodated by slots 130 defined between adjacent partition sections 128. Partition sections 128 and 132 may be formed of any suitable material, such as a suitable plastic having insulating qualities, or as in the embodiment of FIGS. 1 through 3, sections 128 and 132 may in essence be formed as hollow members with suitable insulating material disposed therein.

Referring now to FIG. 10, the partition sections 128 of FIG. 9 may be formed in the manner shown in FIG. 7, i.e., of suitable laminated plastic material with gaskets 114 respectively secured to their top and bottom edges. Thus, as in the embodiments of FIGS. 1 through 3, gaskets 114 sealingly engage each other when trays 65 are not positioned in chest 22 and sealingly engage transverse portion 88 of tray 65 when the tray is positioned therebetween, thus at all times insulating the hot food compartment 44 from the cold food compartment 46.

Referring now to FIGS. 11 and 12, it may be found desirable to provide further insulation between the hot and cold food compartments 44 and 46, and thus I have shown a tray 142 in which the hot and cold food compartments 84 and 86 are formed as separate tray sections 144 and 146 joined by a transverse section 148 formed of suitable insulating material, the three tray sections 144, 146 and 148 being held in assembled relation by a channel-shaped rim 150.

Referring now to FIG. 13, it will be readily apparent that trays usable with my invention may have a larger number of compartments than the two shown in the previous figures. Thus, tray 152 is shown as again having a transverse portion 88 of uniform thickness which extends through the slot defined between adjacent partition sections 50 or 128, as the case may be. Here, however, cold food compartments 154 and 156 are provided on the cold food side of transverse portion 88 while hot food compartments 158, 160 and 162 are provided on the hot food side of transverse portion 88 along with compartment 164 for receiving silverware. While the partition sections have been described and illustrated as including resilient gasket elements which respectively sealingly engage the opposite surfaces of the transverse portions of the trays when the trays are positioned in the chest, and which also respectively sealingly engage each other when the trays are removed from the chest, thereby at all times to insulate the hot food compartment from the cold food compartment, it will be readily apparent that a spring loaded shutter-type device may be substituted for either or both of the gasket elements of adjacent partition sections.

It will now be seen that with my invention, food is directly served to the ultimate consumer upon the same tray upon which it was placed at the preparation area. My system therefore eliminates the use of conventional covers commonly employed to maintain hot and cold food at the desired serving temperature and also pellets, capsules, Pyrex dishes and other insulated food serving containers which in the past have been placed adjacent, in, on, under or about food serving trays. My invention further completely eliminates the need for all supplemental preparation areas, such as floor kitchens in hospitals or galley areas in airplanes utilized to prepare trays for delivery to passengers; this is because in accordance with my invention each tray is completely prepared in the central kitchen and directly delivered to the ultimate consumer without any further tray preparation being necessary. In the partcular case of hospital food preparation, it will be readily comprehended that my invention substantially reduces the possibility of error in the preparation and serving of special diets since, in accordance with my invention, each tray is completely perpared in the diet kitchen, and there is thereafter no possibility of inadvertent substitution of an incorrect food item. The system of my invention is further compatible with existing food preparation and serving systems now in use.

While I have illustrated and described specific embodiments of my invention, further modifications and improvements will occur to those skilled in the art, and I desire therefore in the appended claims to cover all modifications which do not depart from the spirit and scope of my invention.

What is claimed is:

1. Apparatus for storing and delivering a compartmented tray of preportioned hot and cold food from its point of preparation directly to the consumer comprising: transportable chest means; partition means in said chest means vertically dividing the same into two sections, said partition means having at least two vertically spaced-apart sections defining a horizontally extending slot therebetween; at least one food tray having at least two longitudinally spaced-apart compartments formed therein for respectively receiving hot and cold food and defining therebetween a portion extending transversely across said tray and having top and bottom surfaces; and means for removably supporting said tray in said chest with said transverse portion thereof extending through said partition slot and with said two tray compartments respectively located in said two chest sections, said top and bottom surfaces of said tray portions sealingly engaging said partition means sections thereby mutually insulating said chest sections.

2. The combination of claim 1 wherein said chest comprises walls including heat-insulating means and wherein said partition includes heat-insulating means thereby reducing heat transfer from the section of said chest in which the hot food is located to the section in which the cold food is located.

3. The combination of claim 1 wherein said portion of said tray is of generally uniform thickness, and wherein the adjacent edges of said partition sections include means sealingly engaging said tray portion when said tray is in said chest, said last-named means closing said slot when said tray is removed from said chest.

4. The combination of claim 3 wherein said tray comprises two longitudinally spaced sections joined by a transversely extending intermediate section formed of heat-insulating material, said tray portion including said intermediate section, said sealing means engaging said intermediate section.

5. The combination of claim 3 wherein said tray comprises two longitudinally spaced sections joined by a transversely extending intermediate section formed of heat-insulating material, said tray portion including said intermediate section, said sealing means engaging said intermediate section, and a channel member surrounding the peripheral edge of said tray and maintaining said tray sections in assembled relation.

6. Apparatus for storing and delivering a compartmented tray of preportioned hot and cold food from its point of preparation to the consumer comprising: transportable chest means; partition means in said chest means vertically dividing the same into two sections, said partition means having at least two vertically spaced-apart sections defining a horizontally extending slot therebetween; at least one food tray having at least two longitudinally spaced-apart compartments formed therein for respectively receiving hot and cold food and defining therebetween a portion of generally uniform thickness; means for removably supporting said tray in said chest with said portion thereof extending through said partition slot and with said two tray compartments respectively located in said two chest sections; said chest having walls including heat-insulating means, said partition sections including heat-insulating means, the adjacent edges of said partition means sections including means sealingly engaging opposite surfaces of said tray portion when said tray is in said chest and closing said slot when said tray is removed from said chest whereby said chest sections are mutually insulated and heat transfer from the one section of said chest in which the hot food is located to the other section in which the cold food is located is reduced; and means for respectively heating said one chest section and cooling said other chest section.

7. Apparatus for storing and delivering compartmented trays of preportioned hot and cold food from their point of preparation to the consumers comprising: a transportable chest having top, bottom, side, front and back insulated walls defining an interior cavity; at least one of said front and back walls being formed as a door thereby providing access to said cavity; insulated partition means extending vertically between said top and bottom walls and transversely between said front and back walls thereby dividing said cavity into two sections, said partition means comprising a plurality of transversely extending sections with their adjacent edges respectively vertically spaced-apart defining a plurality of transversely extending horizontally disposed slots; a plurality of generally rectangular food trays each having front and back and side edges, each of said trays having at least two longitudinally spaced-apart compartments formed therein for respectively receiving hot and cold food and defining therebetween a portion of generally uniform thickness extending transversely across the tray between said front and back edges; and means on said chest side walls for respectively removably supporting the side edges of said trays in vertically spaced-apart relation with said transverse portions thereof respectively extending through said partition slots and with said two compartments of each tray respectively located in said two cavity sections; said adjacent edges of said partition sections respectively having means thereon for sealingly engaging the opposite surfaces of said transverse portions of said trays when said trays are in said chest and for respectively closing said slots when said trays are removed from said chest thereby reducing transfer of heat from the section of said chest cavity in which the hot food is located to the section in which the cold food is located.

8. The combination of claim 7 wherein said sealing means on said adjacent edges of said partition sections comprises resilient gasket means respectively sealingly engaging said opposite surfaces of said transverse portions of said trays when the same are positioned in said cavity, and respectively sealingly engaging each other when said trays are removed from said cavity thereby at all times to insulate said cavity sections from each other.

9. The combination of claim 7 further comprising means removably supporting each of said partition sections in said cavity.

10. The combination of claim 7 wherein said tray-supporting means comprises vertically extending channel members removably secured to said chest side walls and horizontally extending angle members removably secured to said channel members, the angle members on each side wall having flanges respectively in horizontal alignment for supporting said trays; and further comprising elongated members secured to and extending between respective horizontally aligned flanges of said angle members and respectively secured to said partition sections for supporting the same.

11. The combination of claim 7 wherein each of said partition sections comprises an elongated hollow member formed of rigid material and having spaced side walls and spaced top and bottom walls, an elongated sleeve member formed of resilient material embracing said hollow member, said sleeve member having elongated hollow gasket portions respectively formed on its top and bottom sides, said hollow member being substantially filled with insulating material; adjacent gasket portions respectively sealingly engaging said opposite surfaces of said transverse portions of said trays when the same are positioned in said chest cavity, said adjacent gasket portions respectively sealingly engaging each other when the respective trays are removed from said chest cavity thereby at all times to insulate said cavity portions from each other.

12. The combination of claim 11 further comprising means respectively closing the ends of said hollow members.

13. The combination of claim 11 wherein said sleeve member is transversely divided into two abutting sections, each sleeve member section having a closed end wall thereby closing the ends of said hollow member.

14. The combination of claim 7 wherein said partition sections are joined and supported adjacent the back wall of said chest by a vertically extending portion.

References Cited by the Examiner
UNITED STATES PATENTS

| | | | |
|---|---|---|---|
| 464,058 | 12/1891 | Baldwin | 257—271 |
| 2,386,368 | 10/1945 | Taylor et al. | 34—193 |

CLAUDE A. LE ROY, *Primary Examiner.*

HERMAN BERMAN, GEORGE L. BREHM, CHANCELLOR E. HARRIS, *Examiners.*

E. SUKALO, G. R. KING, *Assistant Examiners.*